（12）United States Patent
Katori

(10) Patent No.: US 8,882,864 B2
(45) Date of Patent: Nov. 11, 2014

(54) FUEL REFORMER INCLUDING A TWO LAYER INTEGRATED ARTICLE

(75) Inventor: Kenji Katori, Kanagawa (JP)

(73) Assignee: Sony Corporation, Tokyo (JP)

( * ) Notice: Subject to any disclaimer, the term of this patent is extended or adjusted under 35 U.S.C. 154(b) by 38 days.

(21) Appl. No.: 12/713,999

(22) Filed: Feb. 26, 2010

(65) Prior Publication Data

US 2010/0150796 A1 Jun. 17, 2010

Related U.S. Application Data

(62) Division of application No. 10/513,548, filed as application No. PCT/JP03/06520 on May 26, 2003, now Pat. No. 7,942,944.

(30) Foreign Application Priority Data

May 27, 2002 (JP) ................................ P2002-151723
May 27, 2002 (JP) ................................ P2002-151724
May 12, 2003 (JP) ................................ P2003-133198

(51) Int. Cl.
*B01J 7/00* (2006.01)
*H01M 8/06* (2006.01)
(Continued)

(52) U.S. Cl.
CPC ........... *H01M 4/94* (2013.01); *C01B 2203/107* (2013.01); *H01M 8/0662* (2013.01); *B01J 31/0219* (2013.01); *C01B 3/505* (2013.01); *B01J 23/40* (2013.01); *Y02E 60/523* (2013.01); *H01M 4/921* (2013.01); *C01B 2203/0233* (2013.01); *C01B 2203/066* (2013.01); *H01M 4/8605* (2013.01); *H01M 8/0625* (2013.01); *B01J 8/0207* (2013.01); *C01B 2203/041* (2013.01); *Y02E 60/50* (2013.01); *C01B 2203/0475* (2013.01); *C01B 3/323* (2013.01); *C01B 2203/1223* (2013.01); *B01J 8/009* (2013.01)
USPC .......................................................... 48/61

(58) Field of Classification Search
CPC .. B01D 53/228; B01D 67/0062; B01D 69/00; B01D 69/10; C01B 3/505; C01B 3/503; H01M 4/8807; H01M 4/8892
USPC ........................... 422/129–242; 429/400–535
See application file for complete search history.

(56) References Cited

U.S. PATENT DOCUMENTS 3,765,946 A * 10/1973 Werner et al. .................. 429/410
5,430,218 A * 7/1995 Miller et al. .................. 585/654

(Continued)

FOREIGN PATENT DOCUMENTS

JP 01-154467 6/1989
JP 06-212469 8/1994
(Continued)

OTHER PUBLICATIONS

Machine Translation of JP 2001-145825.*

(Continued)

*Primary Examiner* — Imran Akram
(74) *Attorney, Agent, or Firm* — K&L Gates LLP

(57) ABSTRACT

A fuel reformer which can easily achieve high weight energy density and high volume energy density, and a method for producing the fuel reformer with ease and high efficiency as well as an electrode for electrochemical device, such as a fuel cell, and an electrochemical device are provided. The present invention is to feed hydrogen obtained from a fuel reformer having a catalyst layer containing Pt for taking out hydrogen from a liquid fuel, such as methanol, and a hydrogen permeable layer, such as a Pd thin film, which is impermeable to liquid and permeable to hydrogen to an electrochemical device such as a fuel cell, which comprises a negative electrode, a positive electrode and a proton conductive film sandwiched therebetween. The present invention provides a method of producing the hydrogen permeable layer in the reformer 1 by forming the hydrogen permeable layer and the catalyst layer on a base layer comprising Al or the like, and removing the base layer by dissolution.

13 Claims, 13 Drawing Sheets

(51) Int. Cl.
*C01B 3/50* (2006.01)
*H01M 4/94* (2006.01)
*H01M 4/86* (2006.01)
*B01J 8/02* (2006.01)
*C01B 3/32* (2006.01)
*B01J 8/00* (2006.01)
*B01J 23/40* (2006.01)
*H01M 4/92* (2006.01)

(56) References Cited

U.S. PATENT DOCUMENTS

| | | | | |
|---|---|---|---|---|
| 5,505,764 | A | * | 4/1996 | Fuentes ............... 95/96 |
| 5,958,091 | A | * | 9/1999 | Sakai et al. ............... 48/61 |
| 6,007,683 | A | * | 12/1999 | Jankowski et al. ...... 204/192.17 |
| 6,033,634 | A | * | 3/2000 | Koga ............... 422/198 |
| 6,183,898 | B1 | * | 2/2001 | Koschany et al. ............ 429/481 |
| 6,350,539 | B1 | * | 2/2002 | Wood et al. ............... 429/450 |
| 6,428,758 | B1 | * | 8/2002 | Schuessler et al. ............ 422/239 |
| 6,436,363 | B1 | * | 8/2002 | Hwang et al. ............... 423/651 |
| 6,536,604 | B1 | * | 3/2003 | Brinker et al. ............... 210/490 |
| 6,541,676 | B1 | * | 4/2003 | Franz et al. ............... 585/250 |
| 7,081,317 | B2 | * | 7/2006 | Fujii et al. ............... 429/432 |
| 2001/0018139 | A1 | * | 8/2001 | Aoyama et al. ............... 429/19 |
| 2002/0062738 | A1 | * | 5/2002 | Yoshida et al. ............... 96/11 |
| 2002/0128334 | A1 | | 9/2002 | Towe et al. |
| 2002/0132145 | A1 | * | 9/2002 | Preidel ............... 429/13 |
| 2003/0148884 | A1 | * | 8/2003 | Ito et al. ............... 502/339 |

FOREIGN PATENT DOCUMENTS

| | | |
|---|---|---|
| JP | 06-321501 | 11/1994 |
| JP | 2516750 | 8/1996 |
| JP | 08-321321 | 12/1996 |
| JP | 2000-126593 | 5/2000 |
| JP | 2001-096953 | 4/2001 |
| JP | 2001-137673 | 5/2001 |
| JP | 2001-145825 | 5/2001 |
| JP | 2002-033113 | 1/2002 |
| JP | 2002-126519 | 5/2002 |

OTHER PUBLICATIONS

Human Translation of JP 2001-145825 A.*
Akira, Kobuchi. JP 2001-145825. Machine translation.
Office Action issued by the Japanese Patent Office on Jun. 18, 2007 for corresponding Japanese Application No. 2003-133198.

* cited by examiner

FUEL REFORMER INCLUDING A TWO LAYER INTEGRATED ARTICLE

CROSS REFERENCES TO RELATED APPLICATIONS

The present application is a divisional of U.S. patent application Ser. No. 10/513,548 filed on Nov. 4, 2004 which is a National Stage of International Application No. PCT/JP03/06520, filed on May 26, 2003, which claims priority to Japanese Patent Application Nos. JP 2002-151723 filed on May 27, 2002, JP 2002-151724 filed on May 27, 2002; and JP 2003-133198 filed on May 12, 2003, the entire contents of which are being incorporated herein by reference.

BACKGROUND

The present invention relates to a fuel reformer for obtaining hydrogen from a liquid fuel and a method for producing the fuel reformer, an electrode for use in an electrochemical device, and an electrochemical device, such as a fuel cell.

As a fuel for a fuel cell for use in automobile, pure hydrogen compressed and contained in a cylinder is mainly studied. On the other hand, as a fuel for a fuel cell for use in stationary apparatus, such as a cogeneration system, reformed gas obtained from methane gas or the like is studied. With respect to the fuel for fuel cell for use in small-size apparatus, methods using hydrogen stored in a hydrogen storage alloy or using a liquid fuel, such as methanol, have been proposed.

In a case where hydrogen stored in the hydrogen storage alloy is used in the fuel cell for a small-size apparatus, because of the weight of the hydrogen storage alloy, it is difficult for the whole of the system to achieve a weight energy density far larger than that of a conventional secondary battery. For this reason, in a case of expecting a fuel cell to exhibit a high weight energy density, the use of the currently used hydrogen storage alloy is unsuitable.

On the other hand, when a liquid fuel, such as methanol, is used in the fuel cell for a small-size apparatus, a direct methanol type in which methanol is directly introduced to a membrane electrode assembly (MEA) in the fuel cell, and a reforming method using a reformer provided independently of the MEA have been proposed.

In the direct methanol method, a mixture of methanol and water in a 1:1 ratio (molar ratio) theoretically serves as a fuel, but an ionic conductor is disadvantageously permeable to methanol and hence it is generally difficult to achieve such a methanol concentration, and, in practice, methanol is diluted to be in a concentration as small as 1 mol/l and then supplied to the MEA. However, in a case where methanol diluted to be in a concentration as small as 1 mol/l on the stage of a fuel tank is used in the fuel cell, it is suitable for the fuel cell to be expected to have a high weight energy density like a case of the fuel cell using pure hydrogen.

Therefore, a method in which methanol having a higher concentration is contained in the fuel tank and the methanol is diluted with water before being introduced to the MEA has been proposed. However, in this method, methanol and water must be fed individually with high accuracy, making a liquid feeding system complicated, and hence this method is not suitable for further miniaturization of the system.

On the other hand, in the method using a reformer independently provided, a methanol solution having a higher methanol concentration can be supplied as a fuel, and therefore the fuel energy density is not lowered and no complicated liquid feeding system is needed. However, in a case where a base material for the reformer is prepared by micro-fabrication of Si or the like as already proposed, the fabrication process is complicated, increasing the cost. Further, the reforming system provided independently of the MEA causes the volume to be larger.

SUMMARY

The present invention relates to a fuel reformer for obtaining hydrogen from a liquid fuel and a method for producing the fuel reformer, an electrode for use in an electrochemical device, and an electrochemical device, such as a fuel cell.

In an embodiment, the present invention provides a fuel reformer which can easily achieve high weight energy density and high volume energy density, and a method for producing the fuel reformer with ease and high efficiency as well as an electrode for an electrochemical device, such as a fuel cell, and an electrochemical device.

For example, the present invention in an embodiment is directed to a fuel reformer having a catalyst layer comprising a catalyst for obtaining hydrogen from a liquid fuel, and a hydrogen permeable layer which is impermeable to liquid and permeable to hydrogen.

In the fuel reformer of the present invention in an embodiment, the above-mentioned liquid fuel (e.g., methanol and water) is supplied to the above-mentioned catalyst layer in the above-mentioned reformer and the above-mentioned liquid fuel is reformed by the above-mentioned catalyst layer into hydrogen gas, and the hydrogen is fed through the above-mentioned hydrogen permeable layer to, for example, an electrochemical device where desired electrochemical energy can be obtained. The liquid fuel is reformed into hydrogen before being fed to the electrochemical device in this way and therefore, even if the liquid fuel having a high concentration is fed to the reformer, liquid, such as methanol, is blocked by the above-mentioned hydrogen permeable layer and hence satisfactorily prevented from penetrating into the above-mentioned electrochemical device, so that power output can efficiently be obtained.

Therefore, especially when the reformer is provided independently of the electrochemical device, the above-mentioned liquid fuel can be supplied in a high concentration and efficiently reformed by the system having a simplified structure, and further the liquid can be prevented from penetrating through the electrochemical device, and thus a fuel reformer having both high weight energy density and high volume energy density can be easily realized.

It is desired that the fuel reformer of the present invention in an embodiment is produced by a method for producing a fuel reformer wherein the method comprises: a step of forming a base layer on a substrate; a step of forming a hydrogen permeable layer on the above-mentioned base layer; a step of forming a catalyst layer on the above-mentioned hydrogen permeable layer; and a step of removing the above-mentioned base layer to obtain an integrated article of the above-mentioned hydrogen permeable layer and the above-mentioned catalyst layer.

Further, it is desired that the fuel reformer of the present invention in an embodiment is produced by a method for producing a fuel reformer wherein the method comprises preparing a fuel reforming portion by: a step of forming a base layer on a substrate; a step of forming a hydrogen permeable layer on the above-mentioned base layer; a step of forming a catalyst layer on the above-mentioned hydrogen permeable layer; and a step of removing the above-mentioned base layer to obtain an integrated article of the above-mentioned hydrogen permeable layer and the above-mentioned catalyst layer, and providing a catalyst electrode having a catalyst layer comprising noble metal carried carbon and an ionic conductive binder, to be integrated with the above-mentioned fuel reforming portion.

In the method of the present invention in an embodiment, for obtaining the above-mentioned hydrogen permeable layer, the above-mentioned hydrogen permeable layer and the above-mentioned catalyst layer are formed on the above-mentioned base layer and then the above-mentioned base layer is removed, and therefore the above-mentioned hydrogen permeable layer can be formed on the above-mentioned base layer as a liquid-impermeable, dense, smooth, and thin film, and, for example, the above-mentioned base layer can be separated only by dissolution.

Therefore, the above-mentioned hydrogen permeable layer can be obtained as a thin film which is such dense and smooth that the film is impermeable to liquid, and which has such a small thickness that the film is permeable to hydrogen without a need to increase the film strength to a large extent, and further the above-mentioned hydrogen permeable layer is formed to be integrated with the above-mentioned catalyst layer for reforming the above-mentioned liquid fuel, and thus a fuel reformer connectable to the above-mentioned electrochemical device can be produced with ease and high efficiency.

Further, the present invention in an embodiment is directed to an electrode for an electrochemical device wherein the electrode has therein a hydrogen permeable layer which is impermeable to liquid and permeable to hydrogen, and further directed to an electrochemical device having the electrode for an electrochemical device of the present invention.

In the electrode for an electrochemical device in an embodiment of the present invention and the electrochemical device having the same, by virtue of having a hydrogen permeable layer which is impermeable to liquid and permeable to hydrogen, if, for example, the above-mentioned liquid fuel (e.g., methanol and water) is directly fed to the fuel electrode in the electrochemical device to reform the above-mentioned liquid fuel into hydrogen gas, and desired electrochemical energy is obtained using the above-mentioned hydrogen gas obtained, liquid, such as methanol, is blocked by the above-mentioned hydrogen permeable layer, and hence the above-mentioned liquid fuel can be fed in a high concentration, and penetration of the liquid fuel through an ionic conductor as conventionally caused can be satisfactorily prevented, so that power output can efficiently be obtained.

Additional features and advantages are described herein, and will be apparent from the following Detailed Description and the figures.

DETAILED DESCRIPTION

Figure 1:
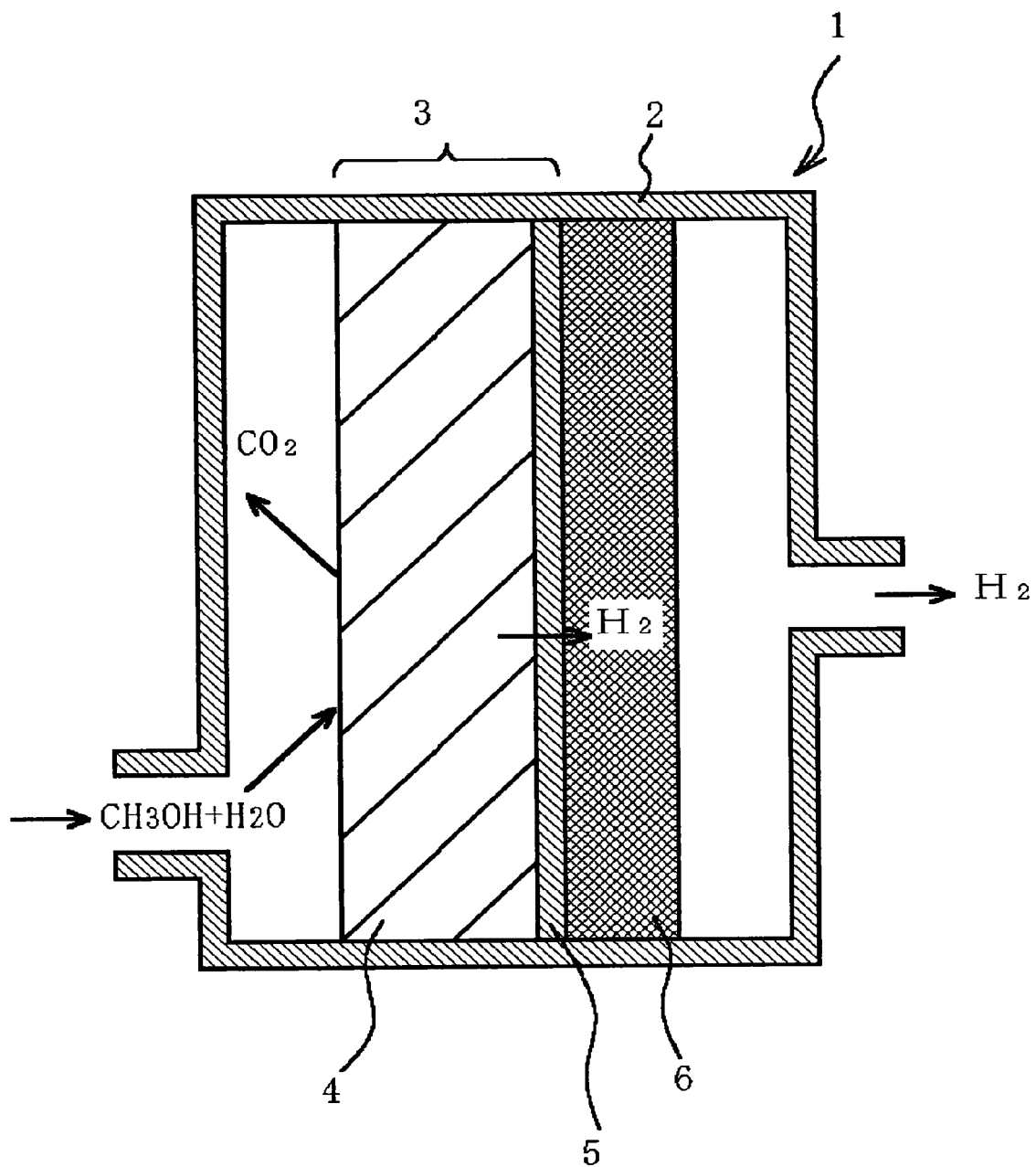
FIG. 1 is a schematic cross-sectional view of a main portion of a fuel reformer according to an embodiment of the present invention.

The present invention relates to a fuel reformer for obtaining hydrogen from a liquid fuel and a method for producing the fuel reformer, an electrode for use in an electrochemical device, and an electrochemical device, such as a fuel cell.

In a fuel reformer of the present invention, a catalyst layer for generating hydrogen from a liquid fuel and a hydrogen permeable layer which is selectively permeable to hydrogen and which is impermeable to the liquid fuel are essential.

It is preferred that the above-mentioned hydrogen permeable layer which is impermeable to liquid and permeable to hydrogen has a thickness of about 2 µm or less. This applies to the electrode for an electrochemical device and the electrochemical device of the present invention according to an embodiment. In a case where the thickness of the hydrogen permeable layer is more than about 2 µm, for example, the cost for the below-mentioned noble metal constituting the above-mentioned hydrogen permeable layer is increased, leading to a possibility that the fuel cell cannot be used in a small-size apparatus. In addition, the hydrogen permeability of the hydrogen permeable layer becomes poor, and satisfactory hydrogen permeability can be obtained only at a high temperature, e.g., 100° C. or higher. The thickness of the hydrogen permeable layer is further preferably about 1.5 µm to about 0.3 µm.

Further, the above-mentioned catalyst layer and the above-mentioned hydrogen permeable layer may be integrated.

It is desired that the above-mentioned hydrogen permeable layer is comprised of a material comprising a noble metal, and examples of the above-mentioned noble metals include platinum, palladium, gold, iridium, silver, rhodium, ruthenium, the like, and combinations thereof.

For obtaining the hydrogen permeable layer which is impermeable to liquid, the film of a Pd (palladium) alloy or the like constituting the hydrogen permeable layer must be dense, but a resultant liquid impermeable film and a portion in contact with the liquid impermeable film are required to be permeable to hydrogen and hence a dense structure is not appropriate. However, in a case where Pd or the like is used in the form of a foil, namely, independent article, the foil needs a thickness of several tens µm or more, leading to problems of the cost and the hydrogen permeability. Therefore, it is required to prepare a dense thin film comprised of a Pd alloy or the like sandwiched between porous materials.

Thus, it is desired that, in accordance with the method for producing a fuel reformer of the present invention, a material soluble in an acid, an alkali, or an organic solvent is deposited on a substrate as a base layer, and then a thin film comprised of a noble metal, such as a Pd alloy, is deposited on the base layer, and further a catalyst layer for obtaining hydrogen from a liquid fuel is formed on the thin film, and the above-mentioned base layer material is removed by dissolution in an acid, an alkali, or an organic solvent to obtain the catalyst layer for obtaining hydrogen from a liquid fuel, which layer has the noble metal thin film formed under the catalyst layer, and is in the form of an independent article (integrated article of the catalyst layer and the noble metal thin film), and then a surface of the noble metal thin film is put on a porous substrate.

In this case, it is required that the binder used in the coated layer (catalyst layer) be chemically stable, and preferred is an organic binder containing fluorine, such as PVdF (polyvinylidene fluoride), and more preferred is an ionic conductive organic binder containing fluorine.

Thus, the liquid fuel is blocked by the noble metal thin film comprised of a Pd alloy or the like, and therefore the liquid fuel is not in contact with the ionic conductor film in the electrochemical device but decomposed by the reforming catalyst into hydrogen and carbon dioxide. The hydrogen formed herein penetrates the thin film comprised of a Pd alloy or the like, and further generates protons on the catalyst in the electrochemical device, and the protons pass through the ionic conductor film like in a general hydrogen fuel cell, forming water on the catalyst on the side of the oxygen electrode.

In this case, the liquid fuel is not brought into contact with the ionic conductor film and therefore, the concentration of, e.g., methanol to be supplied to the reformer can be close to a theoretical value. Thus, differing from the fuel cell using a reformer by an Si micro-fabrication process as conventionally proposed, a fuel cell having high energy density can be realized by an easy method.

From the above, in the present invention, the hydrogen permeable layer advantageously includes a noble metal film that includes platinum, palladium, gold, iridium, silver, rhodium, and ruthenium, e.g., Pd, Pd—V, Pd—Ag, Pt (which prevents stiffening due to hydrogen), the like and combinations thereof.

The catalyst layer for reforming may be comprised of a material comprising an element of the platinum group, such as ruthenium, rhodium, palladium, osmium, iridium, or platinum the like, and combinations thereof including, Pt—Ru, and the above material is advantageously carried on ceramic, such as alumina, or finely divided carbon powder. In addition, CuO—ZnO may be used, and this is advantageously carried on ceramic, such as alumina.

If ceramic or finely divided carbon powder is used as a carrier, the catalyst is further activated, which is advantageous in the catalytic action. Further, for example, if Pt—Ru is used in the catalyst, not only can Pt permit the liquid fuel to undergo oxidative decomposition to efficiently generate hydrogen, but also Ru can prevent Pt from changing in properties due to CO generated simultaneously.

The catalyst layer in an embodiment includes a catalyst bound by a fluorine organic binder, such as PVdF.

Further, the above-mentioned catalyst layer may contain a carbon porous material.

In the method for producing a fuel reformer of the present invention, it is advantageous that a material soluble in an acid, an alkali, or an organic solvent, e.g., aluminum or an aluminum alloy is formed as the above-mentioned base layer on the above-mentioned substrate, and then a noble metal film is formed as the above-mentioned hydrogen permeable layer on the above-mentioned base layer and the above-mentioned catalyst layer is formed on the hydrogen permeable layer, and then the above-mentioned base layer is removed by dissolution in an acid, an alkali, or an organic solvent to obtain the above-mentioned catalyst layer integrated with the above-mentioned noble metal film in the form of an independent article, and then the surface of the above-mentioned noble metal film in the independent article is put on a porous substrate comprised of carbon or the like.

The electrode for an electrochemical device of the present invention in an embodiment is characterized by having therein a hydrogen permeable layer which is impermeable to liquid and permeable to hydrogen, however, it is desired that the electrode further has a catalyst layer comprising a catalyst for obtaining hydrogen from the above-mentioned liquid fuel, and the above-mentioned hydrogen permeable layer and the above-mentioned catalyst layer may be integrated.

It is important that the electrochemical device of the present invention in an embodiment has the above-described electrode for an electrochemical device of the present invention, and it is desired that, for example, the electrochemical device comprises a first electrode, a second electrode, and a proton conductor sandwiched between the electrodes wherein hydrogen obtained from the above-mentioned reformer is fed to the above-mentioned first electrode.

In this case, each of the above-mentioned first electrode and the above-mentioned second electrode can be prepared as a gas diffusion electrode obtained by binding a material, which includes a platinum noble metal, e.g., Pt—Ru or Pt, and conductive fine particles of carbon or the like having the noble metal carried thereon, by an organic binder, such as perfluorosulfonic acid.

Further, in this case, it is advantageous that the above-mentioned gas diffusion electrode is provided so as to closely adhere to a gas diffusion layer that includes a water-repellent carbon layer formed on a porous carbon sheet. Both the layers have gas diffusion properties, and especially the carbon sheet serves also as a substrate and a current collector and further, by virtue of its water repellency, can permit oxygen to penetrate into the catalyst layer on the side of the above-mentioned second electrode and effectively discharge water formed.

In addition, when the carbon porous layer, e.g., carbon sheet as mentioned above, is arranged on the outside of the catalyst layer in the fuel reformer, not only can $CO_2$ generated on the catalyst layer be effectively discharged, but also the carbon porous layer can serve also as a substrate.

It is desired that the electrochemical device of the present invention is constructed as a fuel cell having a construction such that hydrogen obtained from the above-mentioned reformer is fed to the above-mentioned first electrode and oxygen or oxygen-containing gas is fed to the above-mentioned second electrode, and electrochemical energy, such as electromotive force, is obtained from a portion between the above-mentioned first electrode and the above-mentioned second electrode.

On the other hand, in the electrochemical device of the present invention in an embodiment, especially in a fuel cell, the reforming portion for obtaining hydrogen from a liquid fuel, such as methanol, may be integrated with an MEA, and a characteristic feature of the fuel cell resides in that the above-mentioned hydrogen permeable layer which is impermeable to liquid and permeable to hydrogen, e.g., a Pd alloy thin film is provided for keeping the liquid fuel away the ionic (proton) conductor film.

In the method for producing an electrochemical device of the present invention in an embodiment, it is desired that a material soluble in an acid, an alkali, or an organic solvent is deposited on a substrate as a base layer, and then a thin film comprised of a noble metal, such as a Pd alloy, is deposited on the base layer, and further a catalyst layer for obtaining hydrogen from a liquid fuel is formed on the thin film, and the above-mentioned base layer material is removed by dissolution in an acid, an alkali, or an organic solvent to obtain the catalyst layer for obtaining hydrogen from a liquid fuel, which layer has the noble metal thin film formed under the catalyst layer, and is in the form of an independent article (integrated article of the catalyst layer and the noble metal thin film), and then the surface of the noble metal thin film is disposed on the side of the fuel electrode (first electrode) of the MEA in the fuel cell.

In this case, it is required that the binder used in the coated layer (catalyst layer) be chemically stable, and preferred is a fluororesin, such as PVdF (polyvinylidene fluoride). In a case where the fuel electrode is electrically connected to the oxygen electrode (second electrode) through the reforming portion, for lowering the electrical resistance of the reforming portion (so that is functions as a current collector), it is desired that carbon powder or the like for securing electrical conductivity as well as the ceramic carried catalyst are mixed into the catalyst layer.

In the electrochemical device of the present invention in an embodiment, as mentioned above, the liquid fuel is blocked by the noble metal thin film comprised of a Pd alloy or the like, and therefore the liquid fuel is not in contact with the ionic conductor film but decomposed by the reforming catalyst into hydrogen and carbon dioxide. The hydrogen formed herein penetrates the thin film comprised of a Pd alloy or the like, and further generates protons on the catalyst, and the protons pass through the ionic conductor film like in a general hydrogen fuel cell, forming water on the catalyst on the side of the oxygen electrode.

In this case, the liquid fuel is not brought into contact with the ionic conductor film and therefore, the concentration of, e.g., methanol can be made close to a theoretical value. Thus, without a need to provide independently a reformer using an Si micro-fabrication process as conventionally proposed, a fuel cell having high energy density can be realized by an easy method.

From the above, in the electrochemical device of the present invention, the above-mentioned hydrogen permeable layer advantageously comprises a noble metal film comprised of palladium or the like, e.g., Pd, Pd—V, Pd—Ag, or Pt. This prevents stiffening due to hydrogen.

The above-mentioned catalyst layer for reforming may be comprised of a platinum noble metal catalyst, e.g., Pt or Pt—Ru, and the catalyst is advantageously carried on ceramic, such as alumina. In addition, CuO—ZnO may be used, and this is also advantageously carried on ceramic, such as alumina.

When ceramic is used as a carrier, the catalyst is further activated, which is advantageous in the catalytic action. Further, for example, if Pt—Ru is used in the catalyst, not only can Pt permit the liquid fuel to undergo oxidative decomposition to efficiently generate hydrogen, but also Ru can prevent Pt from changing in properties due to CO generated simultaneously.

Further, this catalyst layer includes a carried catalyst (catalyst carried on a carrier) as mentioned above, and conductive powder for securing electrical conductivity, such as carbon powder.

It is preferable that the catalyst layer comprises a catalyst bound by a fluorine organic binder, such as PVdF.

Further, each of the above-mentioned first electrode and the above-mentioned second electrode can be prepared as a gas diffusion electrode obtained by binding a material, which comprises a platinum noble metal, e.g., Pt—Ru or Pt, and conductive fine particles of carbon or the like having the noble metal carried thereon, by an organic binder, such as perfluorosulfonic acid.

In this case, it is advantageous that the gas diffusion electrode is provided so as to closely adhere to a gas diffusion layer comprised of a water-repellent carbon layer formed on a carbon sheet. Both the layers have gas diffusion properties, and especially the carbon sheet serves also as a substrate and a current collector and further, by virtue of its water repellency, can permit oxygen to penetrate into the catalyst layer on the side of the second electrode and effectively discharge water formed.

Further, in this case, on the side of the above-mentioned first electrode, it is advantageous that the above-mentioned hydrogen permeable layer is provided so as to closely adhere to the above-mentioned carbon sheet. Further, the above-mentioned gas diffusion layer may be provided so as to closely adhere to the above-mentioned gas diffusion electrode in the above-mentioned second electrode, and the above-mentioned carbon sheet may be disposed on an outer surface of the above-mentioned gas diffusion layer, and the above-mentioned hydrogen permeable layer may be provided so as to closely adhere to the above-mentioned gas diffusion electrode in the above-mentioned first electrode.

In addition, if the carbon sheet as described above is further arranged on an outside of the above-mentioned catalyst layer on the side of the above-mentioned first electrode, not only can $CO_2$ generated on the above-mentioned first electrode be effectively discharged, but also the carbon sheet can serve also as a substrate and a current collector.

It is desired that the electrochemical device of the present invention in an embodiment is constructed as a fuel cell having a construction such that the above-mentioned liquid fuel, e.g., methanol is fed to the above-mentioned first electrode and oxygen or oxygen-containing gas is fed to the above-mentioned second electrode, and electrochemical energy, such as electromotive force, is obtained from a portion between the above-mentioned first electrode and the above-mentioned second electrode. In this case, the above-mentioned catalyst layer in the above-mentioned first electrode and the carbon sheet in the above-mentioned second electrode may be used as a current collector.

In the method for producing an electrochemical device of the present invention in an embodiment, it is advantageous that a material soluble in an acid, an alkali, or an organic solvent, e.g., aluminum or an aluminum alloy is formed as the above-mentioned base layer on the above-mentioned substrate, and then a noble metal film is formed as the above-mentioned hydrogen permeable layer on the above-mentioned base layer, and the above-mentioned catalyst layer is formed on the above-mentioned hydrogen permeable layer, and then the above-mentioned base layer is removed by dissolution in an acid, an alkali, or an organic solvent to obtain the above-mentioned catalyst layer integrated with the above-mentioned noble metal film in the form of an independent article, and then the surface of the above-mentioned noble metal film in the independent article is disposed on the side of the above-mentioned first electrode.

Hereinbelow, the preferred embodiments of the present invention will be described with reference to the drawings.

FIG. 1 diagrammatically illustrates a reformer 1 for reforming a liquid fuel, such as methanol.

In the reformer 1, a reforming portion 3 placed in a housing 2 includes an integrated article of a reforming catalyst layer 4 for decomposing a liquid fuel, e.g., a mixture of methanol and water into hydrogen and carbon dioxide, and a thin film 5 comprised of, e.g., Pd, which is permeable to hydrogen generated and impermeable to methanol. The Pd thin film 5 is provided so as to closely adhere to a porous substrate 6 comprised of carbon paper or the like.

(Reforming portion: $CH_3OH+H_2O \rightarrow CO_2+3H_2$)

The reformer 1 is connected to the below-described fuel cell as an electricity generating portion on the side of a fuel electrode (first electrode), and the hydrogen gas obtained is fed to the side of the fuel electrode. For obtaining the Pd thin film 5 having both liquid impermeability and hydrogen selective permeability, it is desired that the Pd thin film 5 is formed so that it is dense and submicron or less in thickness.

Figure 2:
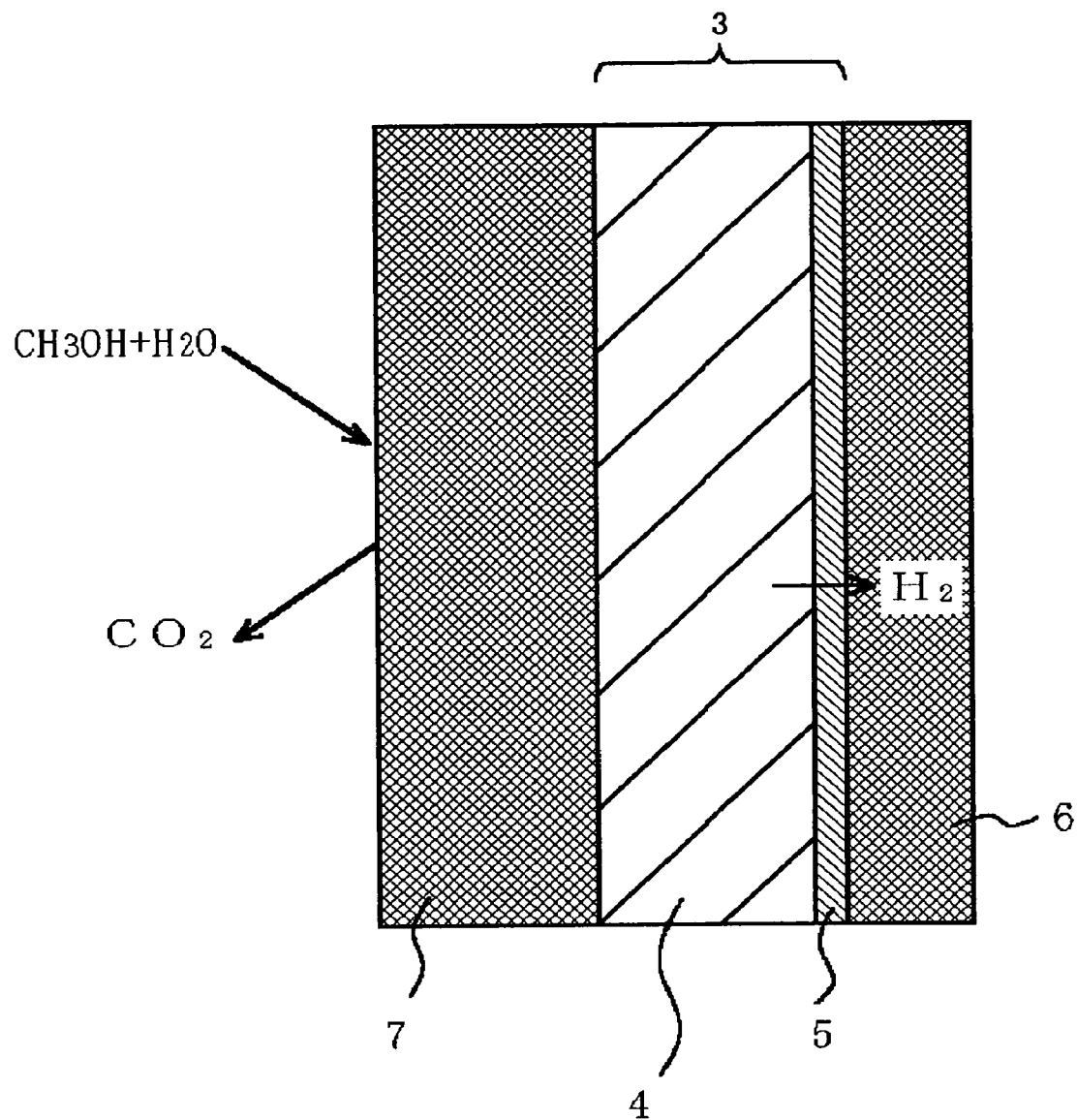
FIG. 2 is a schematic cross-sectional view of a main portion of another fuel reformer according to the embodiment of the present invention.

FIG. 2 shows an example in which a carbon porous sheet (carbon sheet) 7 is further provided outside the reforming catalyst layer 4 shown in FIG. 1 (housing 2 is not shown in FIG. 2). By virtue of having water repellency, the carbon sheet 7 can effectively discharge carbon dioxide formed by decomposition of the liquid fuel, and, in addition to excellent actions and effects of the reforming portion shown in FIG. 1, the carbon sheet prevents clogging due to carbon dioxide, and hence is advantageous from the viewpoint of maintaining the catalyst activity.

Figure 3:
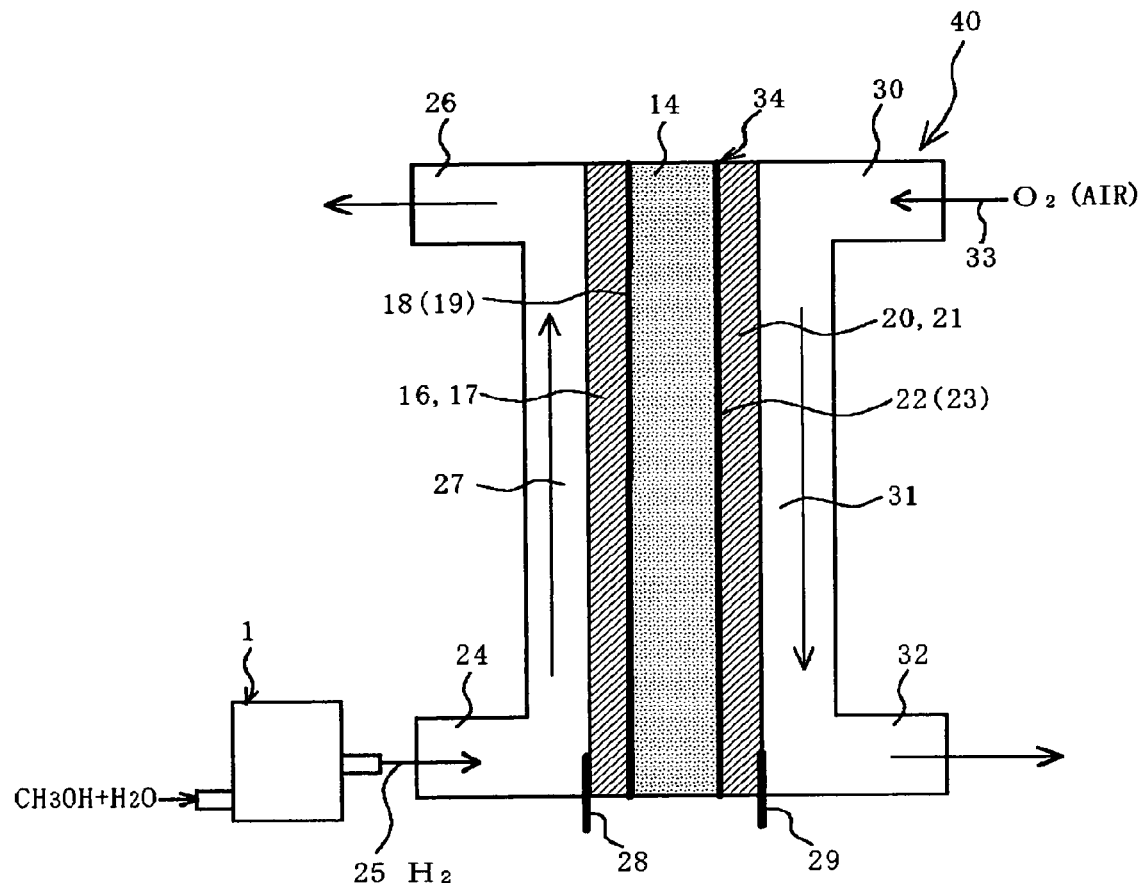
FIG. 3 is a schematic view of the whole fuel cell system according to the embodiment of the present invention.

As shown in FIG. 3, a fuel cell 40 as an electricity generating portion has an MEA having a negative electrode (fuel electrode or hydrogen electrode) 19 and a positive electrode (oxygen electrode) 23 wherein the electrodes are opposite to each other, and respectively have terminals 28, 29 and respectively have catalysts 18, 22 closely attached thereto or dispersed therein, and a proton conductor film 14 sandwiched between the electrodes. During the use, on the side of the negative electrode 19, hydrogen 25 obtained from the reformer 1 is fed through an inlet 24, and discharged through a discharge outlet 26 (which may not be provided). A fuel ($H_2$) 25 generates protons while passing through a flow path 27, and the protons moves, together with protons generated at the proton conductor film 14, to the positive electrode 23 where the protons react with oxygen (air) 33 which is fed to a flow path 31 through an inlet 30 and goes toward an exhaust outlet 32, thus obtaining desired electromotive force.

Fuel electrode: $3H_2 \rightarrow 6H^+ + 6e^-$

Oxygen electrode: $6H^+ + 6e^- + 3/2O_2 \rightarrow 3H_2O$

Figure 4:
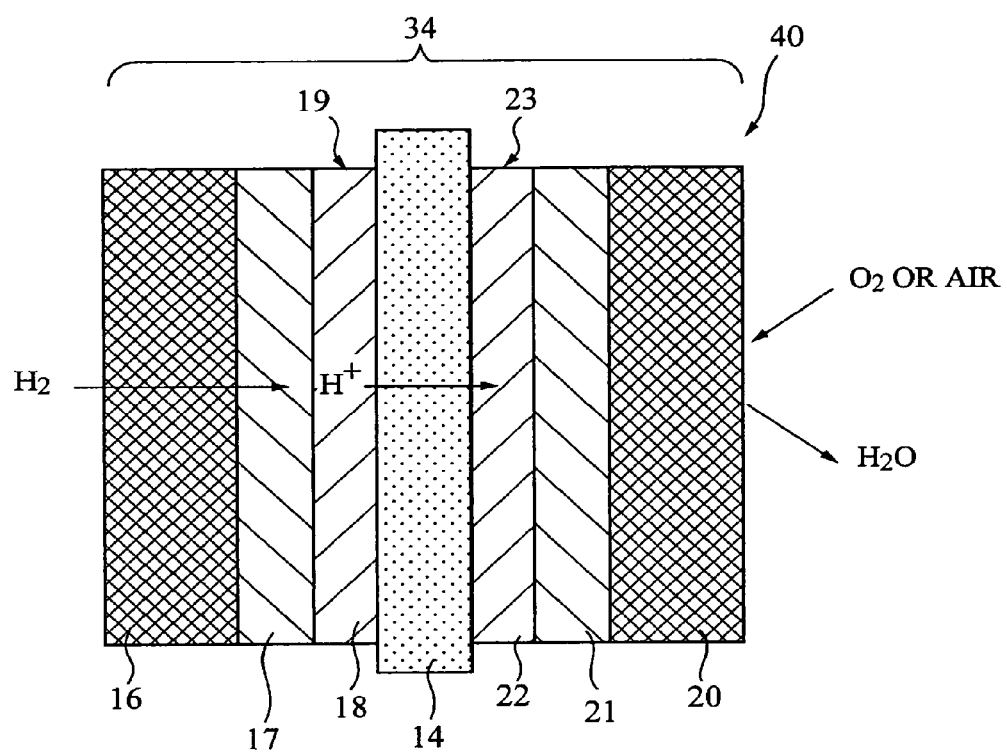
FIG. 4 is a schematic cross-sectional view of an electricity generating portion (MEA) of the fuel cell according to the embodiment of the present invention.

In the fuel cell, an MEA portion (electricity generating portion) 34 may be comprised of an MEA which, as shown in FIG. 4, includes the ionic (proton) conductor film 14 sandwiched between the fuel electrode (first electrode) 19 comprising the catalyst layer (gas diffusion electrode) 18 provided so as to closely adhere to a gas diffusion layer 17 formed on, for example, a carbon sheet 16, and the oxygen electrode (second electrode) 23 including the catalyst layer (gas diffusion electrode) 22 provided so as to closely adhere to a gas diffusion layer 21 formed on, for example, a carbon sheet 20.

In the ionic (proton) conductor film 14 used in the MEA, a perfluorosulfonic acid resin (e.g., Nafion, manufactured and sold by DuPont) or the like can be used.

In the fuel cell 40, for example, methanol fed to the reformer 1 as a liquid fuel is blocked by the Pd alloy thin film 5 and hence, the methanol is not in contact with the ionic conductor film 14 but decomposed by the reforming catalyst layer 4 into hydrogen and carbon dioxide. The hydrogen formed herein penetrates the Pd alloy thin film 5 and the porous substrate 6 and is fed to the electricity generating portion 34, and further generates protons on the catalyst layer 18, and the protons penetrates through the ionic conductor film 14 like in a general hydrogen fuel cell, forming water on the catalyst layer 22 on the side of the oxygen electrode.

Thus, the liquid fuel is not brought into contact with the ionic conductor film 14 and therefore, the concentration of, e.g., methanol can be made close to a theoretical value, and further, differing from the fuel cell using a reformer by an Si micro-fabrication process as conventionally proposed, a fuel cell having high energy density can be realized by an easy method.

It is noted that, as the liquid fuel fed to the reformer 1, not only methanol but also an alcohol, such as ethanol or propanol, or liquefied natural gas can be used. To the oxygen electrode in the fuel cell 40 can be fed oxygen or oxygen-containing gas, such as air.

For preparing an integrated article of the reforming catalyst layer 4 and the Pd thin film 5 in the reformer 1, for example, a method shown in FIG. 5A to FIG. 5E is advantageously employed.

Figure 5A:
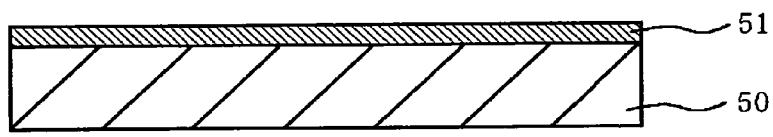
FIG. 5A-FIG. 5E are schematic cross-sectional views in each step of a producing method of the fuel reformer according to the embodiment of the present invention.
Figure 5B:
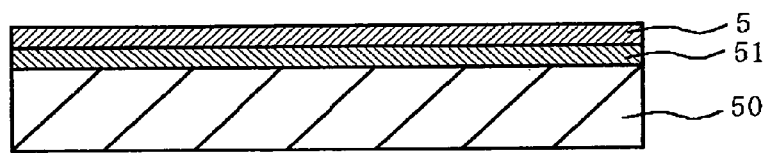

First, as shown in FIG. 5A, Al is deposited on a glass substrate 50 by sputtering to form a base layer 51, and, as shown in FIG. 5B, Pd is deposited on the base layer by sputtering to form a liquid-impermeable, hydrogen-selective permeable film 5.

Figure 5C:
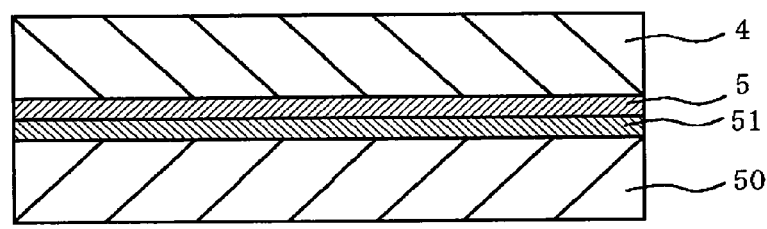

As shown in FIG. 5C, powder comprising $Al_2O_3$ powder having Pt carried thereon, carbon powder as a conductive material, and a binder comprised of PVdF were kneaded together in an organic solvent, and then applied onto the film 5 and dried to form a reforming catalyst layer 4.

Figure 5D:
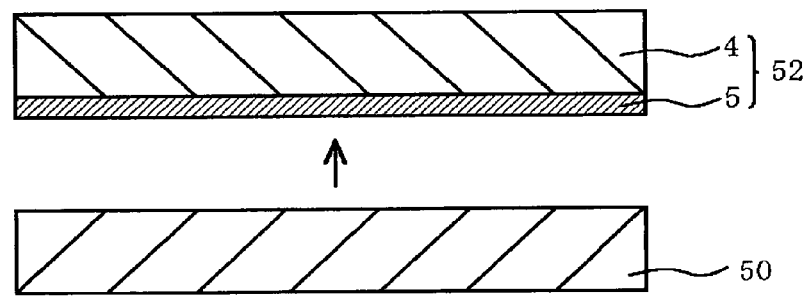

After the drying, as shown in FIG. 5D, the glass substrate 50 having the layers formed thereon is immersed in an NaOH solution to dissolve the Al layer 51, obtaining an independent article 52 of the Pd thin film 5 having the reforming catalyst layer 4. Al is solely dissolved in an alkali, resulting in a structure such that the coated film 4 is deposited on the Pd thin film 5.

Figure 5E:
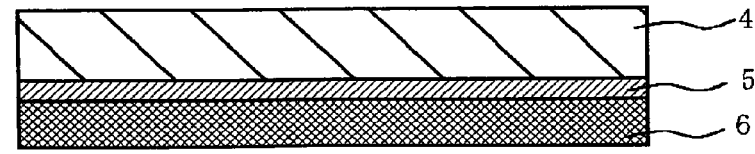

Then, as shown in FIG. 5E, this independent article 52 is put on a porous substrate (porous carbon paper) 6, and the whole of the resultant article is placed in a housing 2.

Thus, the reformer 1 including the catalyst layer 4 and the hydrogen-selective permeable layer 5 which layers are integrated with each other is obtained. The reformer 1 is connected to the above-described fuel cell 40 through a gas conduit.

In this method for producing a reformer, the Pd thin film 5 is formed on the base layer 51 by sputtering, and the reforming catalyst layer 4 is formed on the Pd thin film by coating, and then the base layer 51 is removed by dissolution. Therefore, almost no stress is exerted on the film when separating the Pd thin film 5 having the reforming catalyst layer 4, and hence, even if the film has only small mechanical strength, the independent article 52 can be easily obtained, and further the Pd thin film 5 obtained is thin, dense, and smooth, so that a liquid-impermeable, hydrogen-selective permeable film can be surely formed.

The base layer 51 described above is not limited to Al, and other metals, such as an Al alloy, can be used. Alternatively, in a case where polyurethane is used in the base layer, acetone may be used for removing the base layer by dissolution, and a combination of the material for the base layer and the solvent can be appropriately selected. Further, as the solvent, an alkali, such as NaOH, or an acid, such as HCl, may be used.

Figure 6:
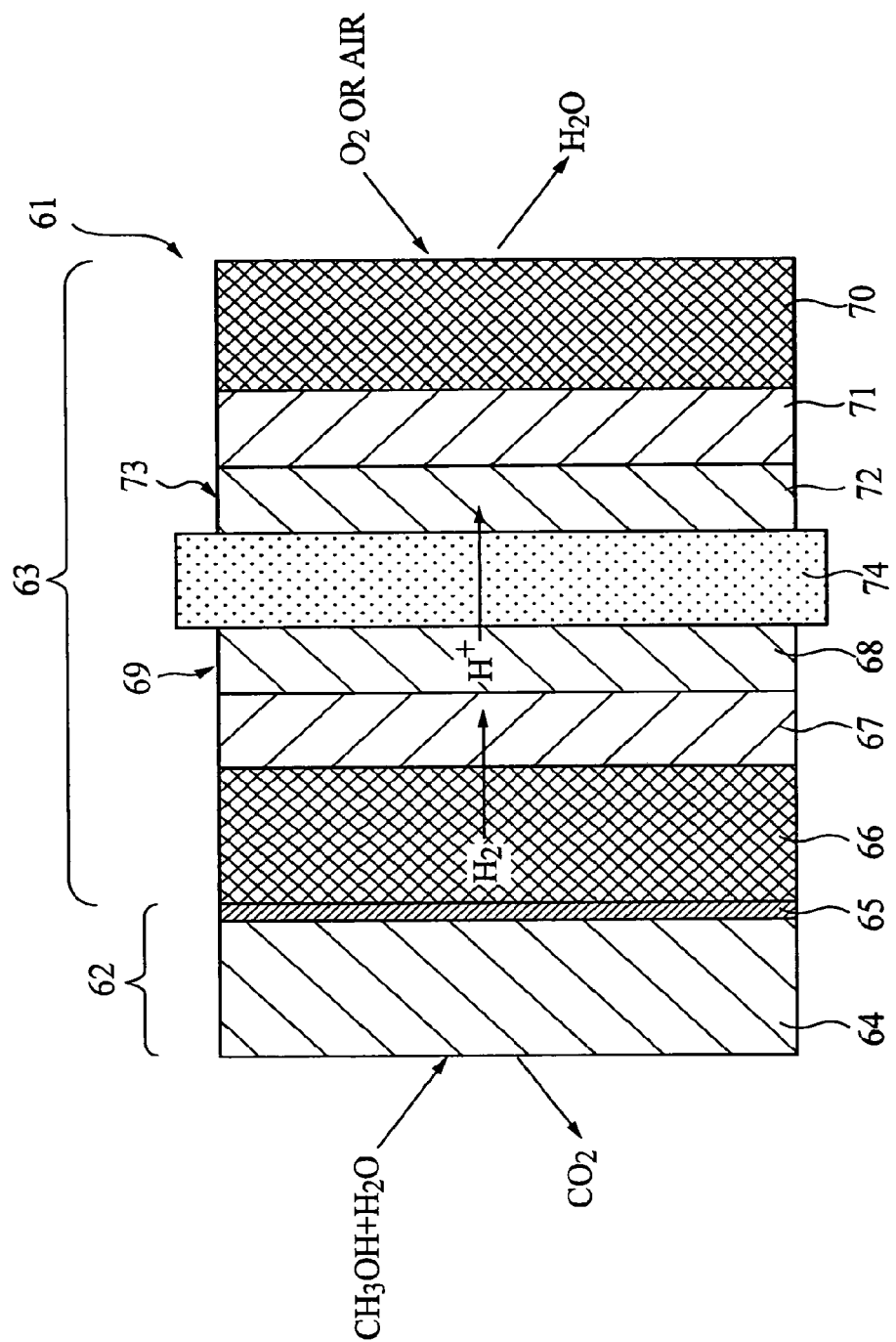
FIG. 6 is a schematic cross-sectional view of a main portion of a fuel cell according to another embodiment of the present invention.

A fuel cell 61 diagrammatically shown in FIG. 6 comprises a reforming portion (membrane reactor) 62 for reforming a liquid fuel, such as methanol, and an electricity generating portion (MEA) 63, which portions are integrated with each other.

The reforming portion 62 includes an integrated article of a reforming catalyst layer 64 for decomposing a liquid fuel, e.g., a mixture of methanol and water into hydrogen and carbon dioxide, and a thin film 65 comprised of, e.g., Pd, which is permeable to hydrogen generated and impermeable to methanol. The Pd thin film 65 is provided so as to closely adhere to the electricity generating portion 63 on the side of the fuel electrode (first electrode). For obtaining the Pd thin film 65 having both liquid impermeability and hydrogen selective permeability, it is desired that the Pd thin film 65 is formed so that it is dense and submicron or less in thickness.

The electricity generating portion 63 includes an MEA which comprises an ionic (proton) conductor film 74 sandwiched between a fuel electrode (first electrode) 69 comprising a catalyst layer (gas diffusion electrode) 68 provided so as to closely adhere to a gas diffusion layer 67 formed on, for example, a carbon sheet 66, and an oxygen electrode (second electrode) 73 comprising a catalyst layer (gas diffusion electrode) 72 provided so as to closely adhere to a gas diffusion layer 71 formed on, for example, a carbon sheet 70.

In the ionic (proton) conductor film 74 used in the MEA, a perfluorosulfonic acid resin (e.g., Nafion, manufactured and sold by DuPont) or the like can be used.

Direct methanol method:

Reforming portion: $CH_3OH + H_2O \rightarrow CO_2 + 3H_2$ 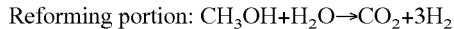

Fuel electrode: $3H_2 \rightarrow 6H^+ + 6e^-$ 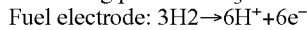

Oxygen electrode: $6H^+ + 6e^- + 3/2O_2 \rightarrow 3H_2O$ 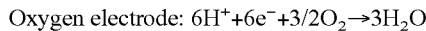

In preparation of the reforming portion 62, for example, as described below, Al soluble in an alkali is deposited on a substrate by sputtering, and Pd is deposited on the resultant Al film by sputtering to form the liquid-impermeable, hydrogen-permeable film 65, and the reforming catalyst layer 64 includes of powder including $Al_2O_3$ (alumina) powder having Pt or Pt—Ru carried thereon and carbon powder as a conductive material which are bound together by a binder comprised of PVdF is applied onto the Pd thin film 65. Then, the Al film is removed by dissolution in an alkali to obtain an independent article of the Pd thin film 65 having the reforming catalyst layer 64.

Then, the independent article is provided on the carbon sheet 66 of the MEA on the side of the fuel electrode so that the Pd thin film 65 is in contact with the carbon sheet. Thus, a structure comprising the reforming catalyst layer 64, the hydrogen-selective permeable Pd thin film 65, and the MEA which are integrated with each other is obtained.

Further, in preparation of the electricity generating portion 63, for example, as described below, a coating composition comprising a fluororesin and carbon powder is applied onto the porous carbon sheet 66 to form a water-repellent carbon coated layer as the base layer (gas diffusion layer) 67, and then a coating composition including a Pt—Ru alloy catalyst carried on carbon and an ionic conductor, such as perfluorosulfonic acid, is applied onto the carbon sheet 66 having the base layer 67 to form the catalyst layer (fuel electrode catalyst electrode) 68. Similarly, a coating composition comprising a Pt catalyst carried on carbon and an ionic conductor, such as perfluorosulfonic acid, is applied onto the carbon sheet 70 having the base layer 71 to form the catalyst layer (oxygen electrode catalyst electrode) 72.

The thus prepared oxygen electrode catalyst electrode 72 and fuel electrode catalyst electrode 68 are disposed on both sides of the ionic conductor film 74, e.g., a perfluorosulfonic acid film, and bonded together under pressure by means of a heated press to produce the MEA for fuel cell.

In the fuel cell 61 shown in FIG. 6, for example, methanol fed to the fuel electrode as a liquid fuel is blocked by the Pd alloy thin film 65 and hence, the methanol is not in contact with the ionic conductor film 74 but decomposed by the reforming catalyst layer 64 into hydrogen and carbon dioxide. The hydrogen formed herein penetrates the Pd alloy thin film 65, the carbon sheet 66, and the gas diffusion layer 67, and further generates protons on the catalyst layer 68, and the protons pass through the ionic conductor film 74 like in a general hydrogen fuel cell, forming water on the catalyst layer 72 on the side of the oxygen electrode.

Thus, the liquid fuel is not brought into contact with the ionic conductor film 74 and therefore, the concentration of, e.g., methanol can be made close to a theoretical value, and further, without a need to provide independently a reformer using an Si micro-fabrication process as conventionally proposed, a fuel cell having high energy density can be realized by an easy method.

Figure 7:
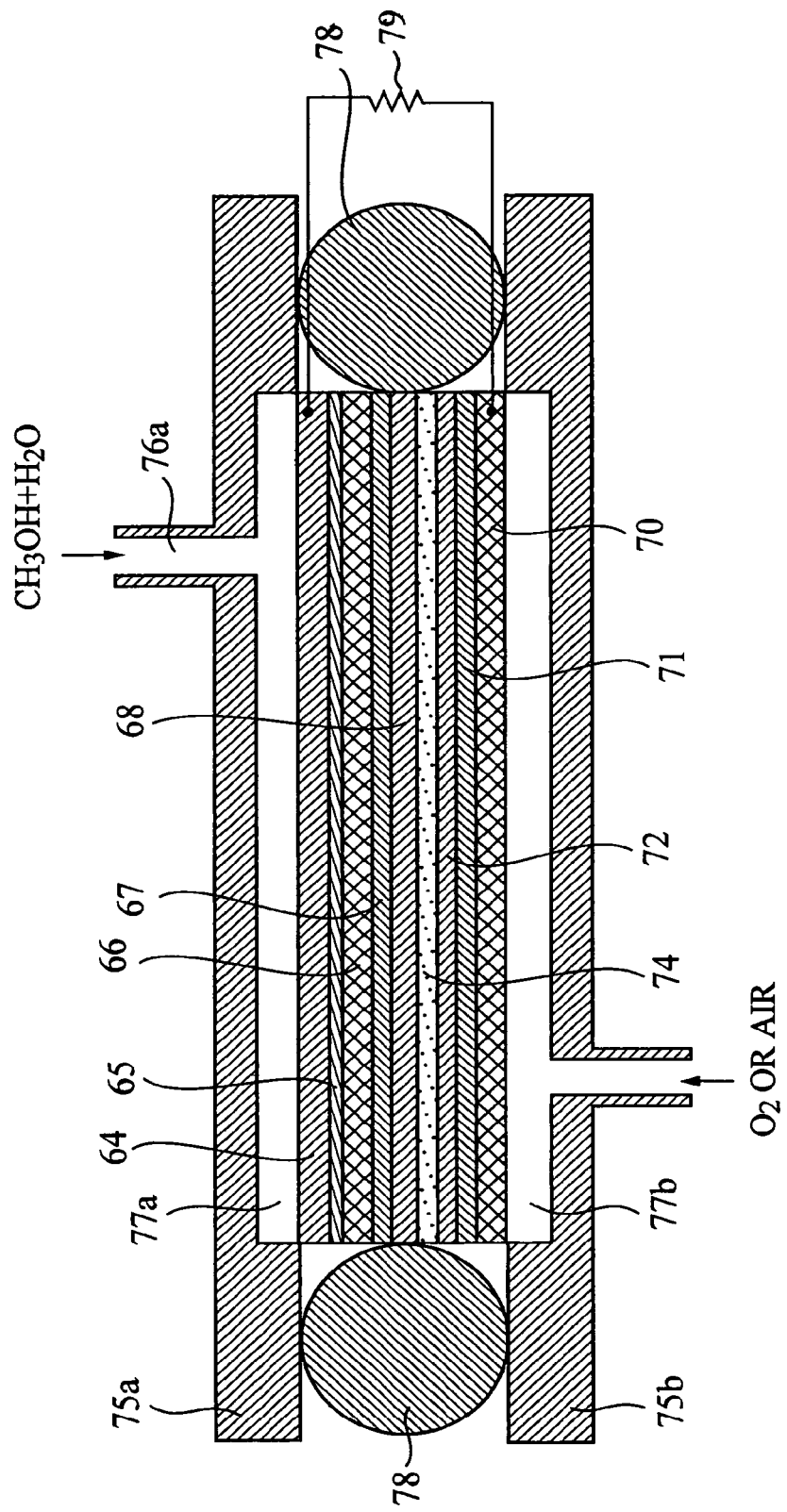
FIG. 7 is a schematic cross-sectional view of a fuel cell unit according to the embodiment of the present invention.

The fuel cell 61 is, for example, as shown in FIG. 7, disposed between outer containers 75a-75b to produce a fuel cell unit. On the side of the fuel electrode, a fuel chamber 77a having a fuel feeding inlet 76a is formed, and, on the side of the oxygen electrode, an oxygen chamber 77b having an oxygen or air feeding inlet 76b is formed (when using air, the electrode may be in air), and the cell unit is sealed with packings 78 provided at peripheral portions of the outer containers 75a-75b. An electric current as electrochemical energy is taken out from the reforming catalyst layer 64, and to a closed circuit formed with the carbon sheet 70 is connected an external load 79 where electromotive force can be obtained.

As the liquid fuel, not only methanol but also an alcohol, such as ethanol or propanol, or liquefied natural gas can be used. To the oxygen electrode can be fed oxygen or oxygen-containing gas, such as air.

Figure 8:
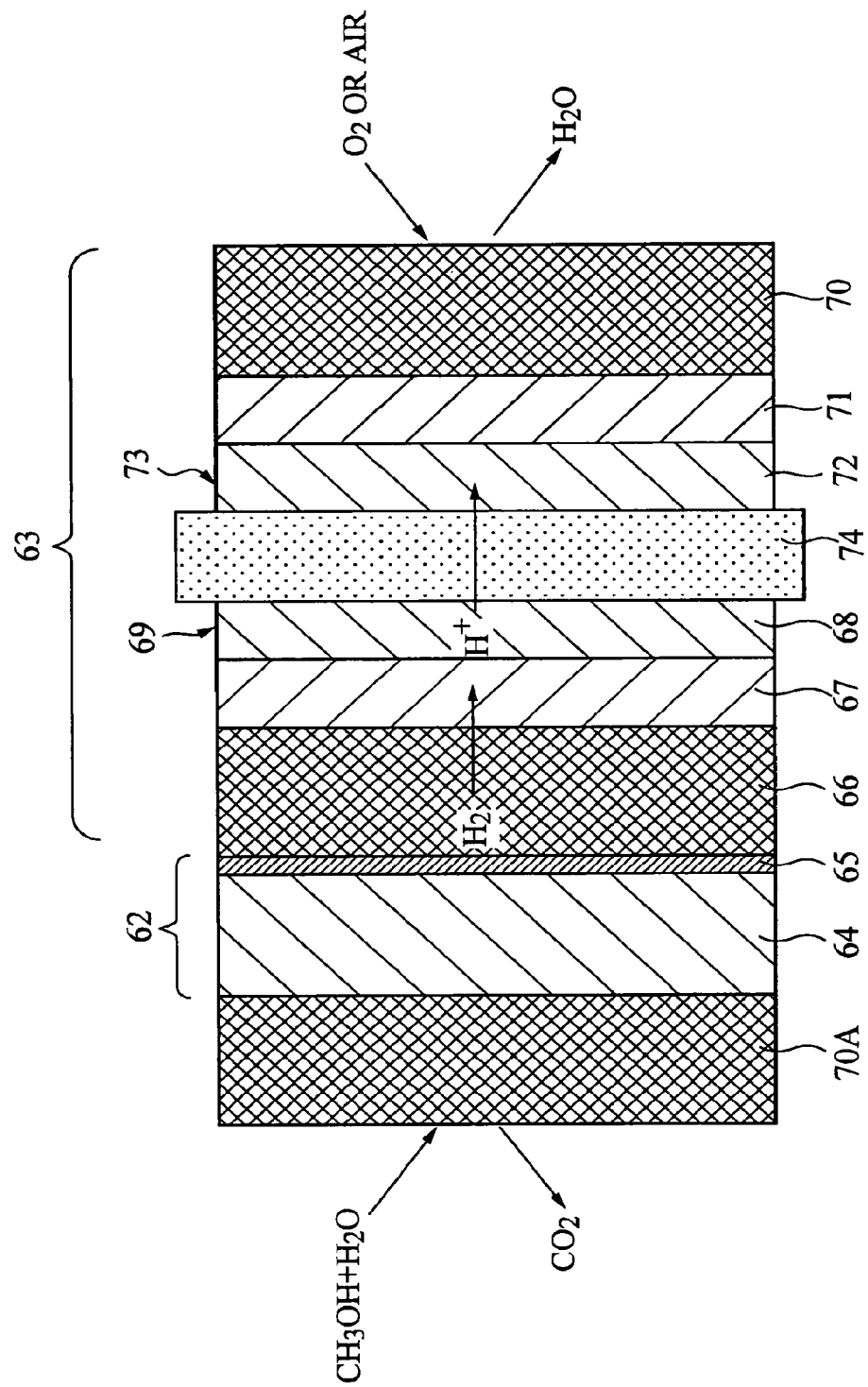
FIG. 8 is a schematic cross-sectional view of another fuel cell of the embodiment of the present invention.

FIG. 8 shows an example in which a carbon sheet 70A is further provided outside the reforming catalyst layer 64 shown in FIG. 6.

By virtue of having water repellency, the carbon sheet 70A can effectively discharge carbon dioxide formed by decomposition of the liquid fuel, and, in addition to excellent operations and effects of the fuel cell shown in FIG. 6, the carbon sheet prevents clogging due to carbon dioxide, and hence is advantageous from the viewpoint of maintaining the catalyst activity.

Figure 9:
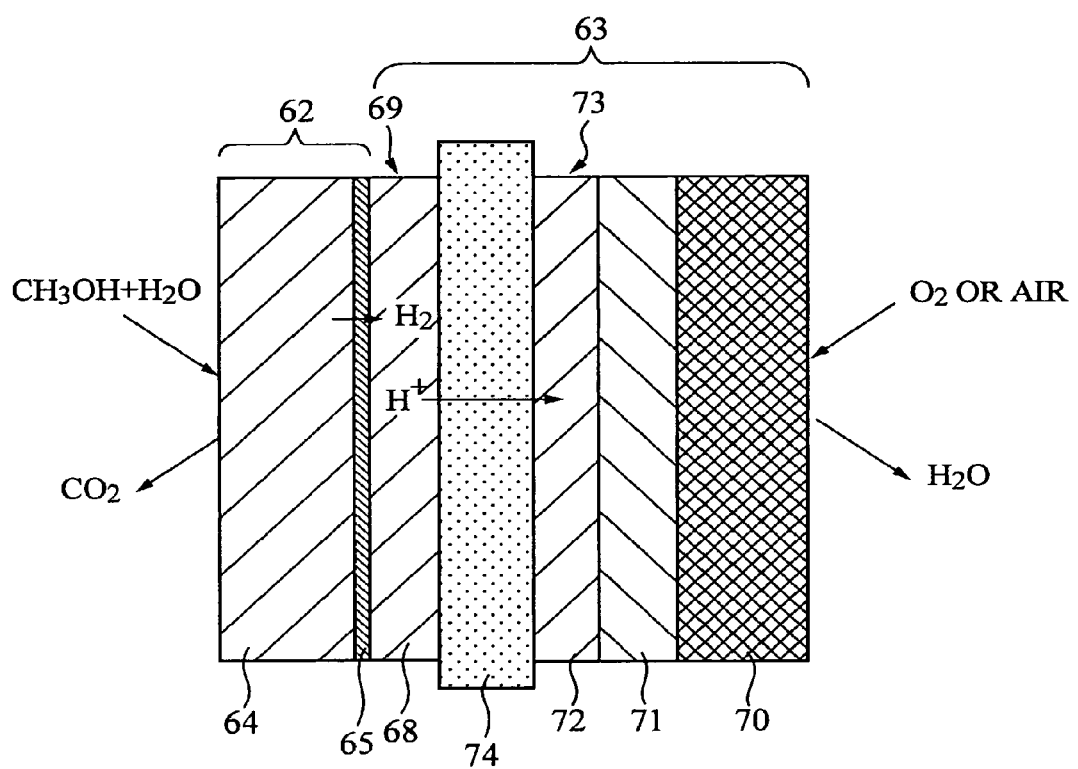
FIG. 9 is a schematic cross-sectional view of another fuel cell of the embodiment of the present invention.

FIG. 9 shows an example of the fuel cell shown in FIG. 6 in which the carbon sheet 66 and the gas diffusion layer 67 in the fuel electrode are omitted so that the Pd thin film 65 closely adheres directly to the catalyst layer (fuel electrode) 68.

By employing this construction, the distance of diffusion of hydrogen formed by reforming the fuel to the catalyst layer 68 can be reduced, and further the fuel cell can be reduced in thickness.

Figure 10:
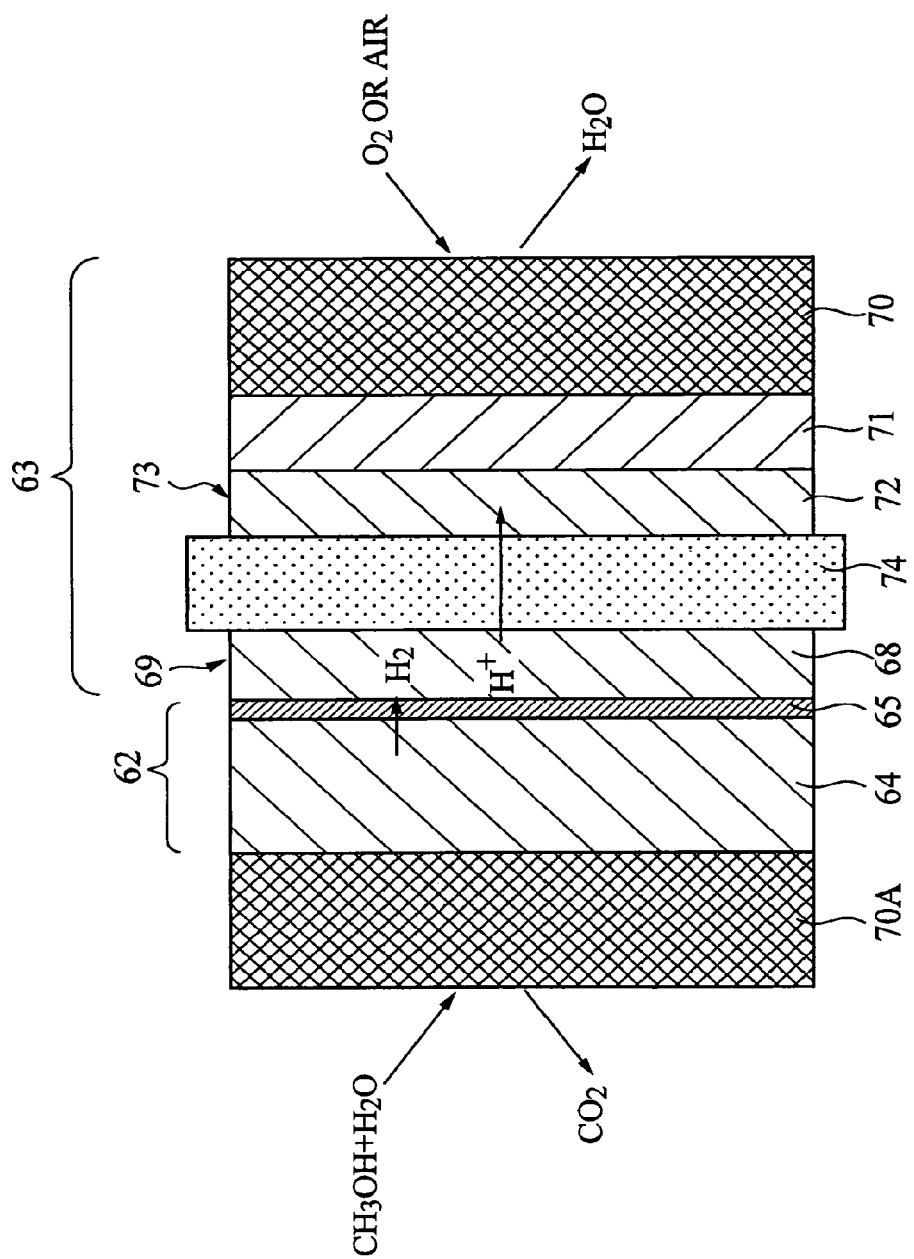
FIG. 10 is a schematic cross-sectional view of further another fuel cell of the embodiment of the present invention.

FIG. 10 shows an example of the fuel cell shown in FIG. 9 in which a water-repellent carbon sheet 70A is further provided outside the reforming catalyst layer 64 similarly to the example of FIG. 8.

Figure 11:
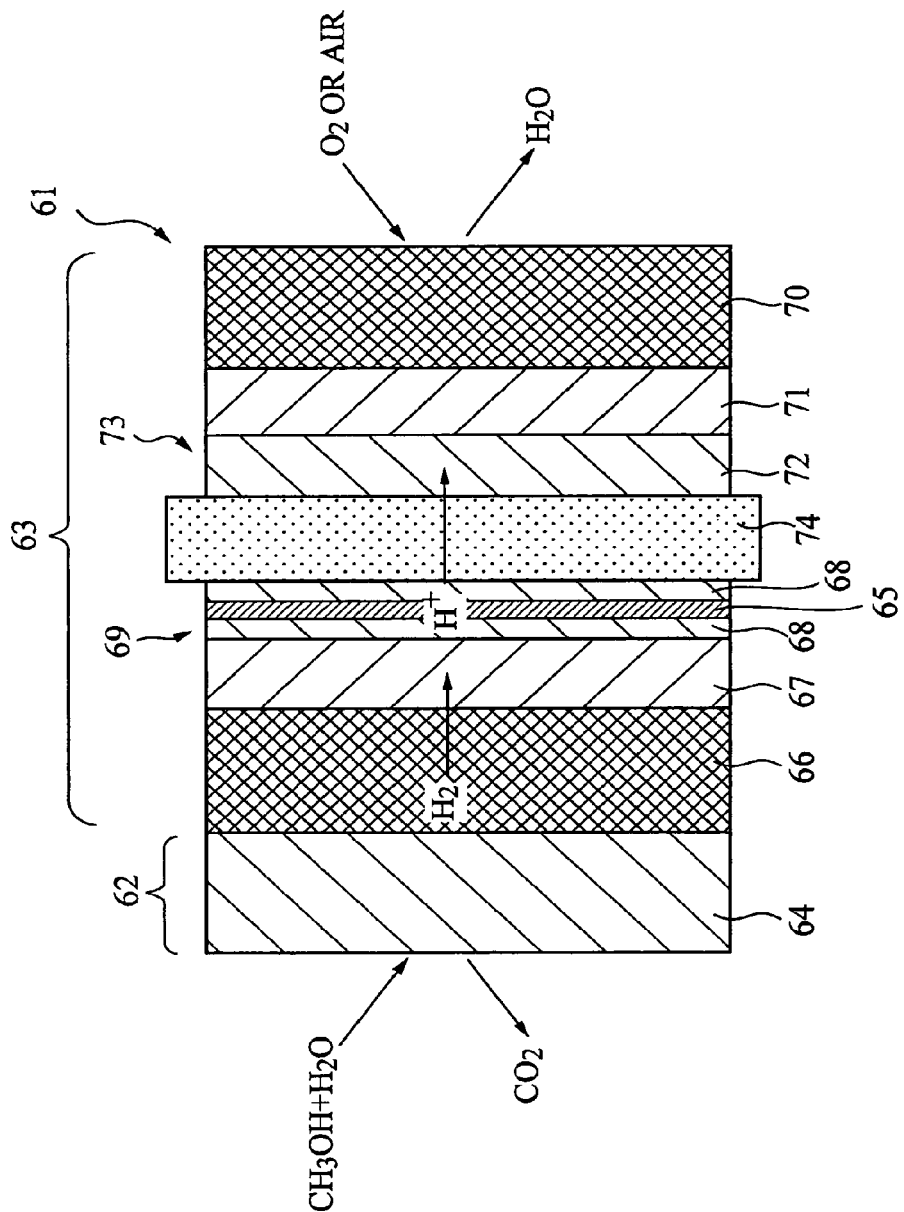
FIG. 11 is a schematic cross-sectional view of further another fuel cell of the embodiment of the present invention.

Alternatively, the main portion of the fuel cell shown in FIG. 6 may be changed to one shown in FIG. 11 in which the Pd thin film 65 is formed in the catalyst layer 68.

Direct methanol method

Reforming portion: $CH_3OH + H_2O \rightarrow CO_2 + 3H_2$ 

Fuel electrode: $3H_2 \rightarrow 6H^+ + 6e^-$ 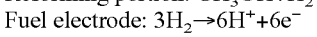

Oxygen electrode: $6H + 6e^- + 3/2O_2 \rightarrow 3H_2O$ 

In the above examples, for preparing an integrated article of the reforming catalyst layer 64 and the Pd thin film 65, for example, a method shown in FIG. 12A to FIG. 12E is preferably employed.

Figure 12A:
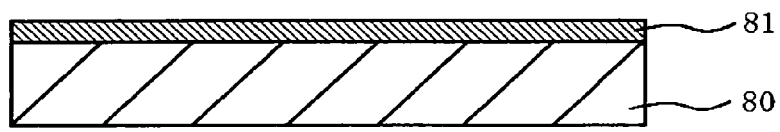
FIG. 12A-FIG. 12E are schematic cross-sectional views in each step of a producing method of the fuel cell according to the embodiment of the present invention.
Figure 12B:
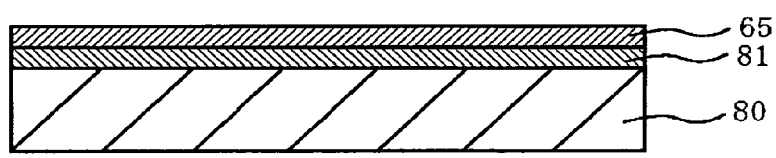

First, as shown in FIG. 12A, Al is deposited on a glass substrate 80 by sputtering to form a base layer 81, and, as shown in FIG. 12B, Pd is deposited thereon by sputtering to form a liquid-impermeable, hydrogen-selective permeable film 65.

Figure 12C:
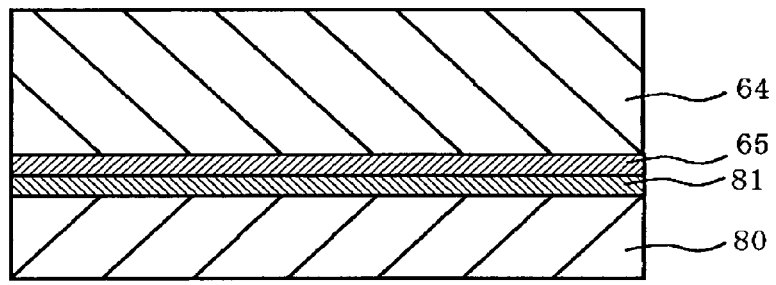

As shown in FIG. 12C, powder comprising $Al_2O_3$ powder having Pt carried thereon, carbon powder as a conductive material, and a binder comprised of PVdF were kneaded together in an organic solvent, and then applied onto the film 65 and dried to form a reforming catalyst layer 64.

Figure 12D:
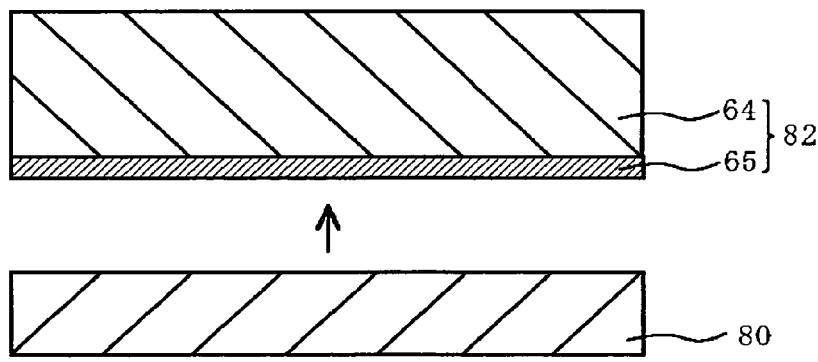

After the drying, as shown in FIG. 12D, the glass substrate 80 having the layers formed thereon is immersed in an NaOH solution to dissolve the Al layer 81, obtaining an independent article 82 of the Pd thin film 65 having the reforming catalyst layer 64. Al is solely dissolved in an alkali, resulting in a structure such that the coated film 64 is deposited on the Pd thin film 65.

Figure 12E:
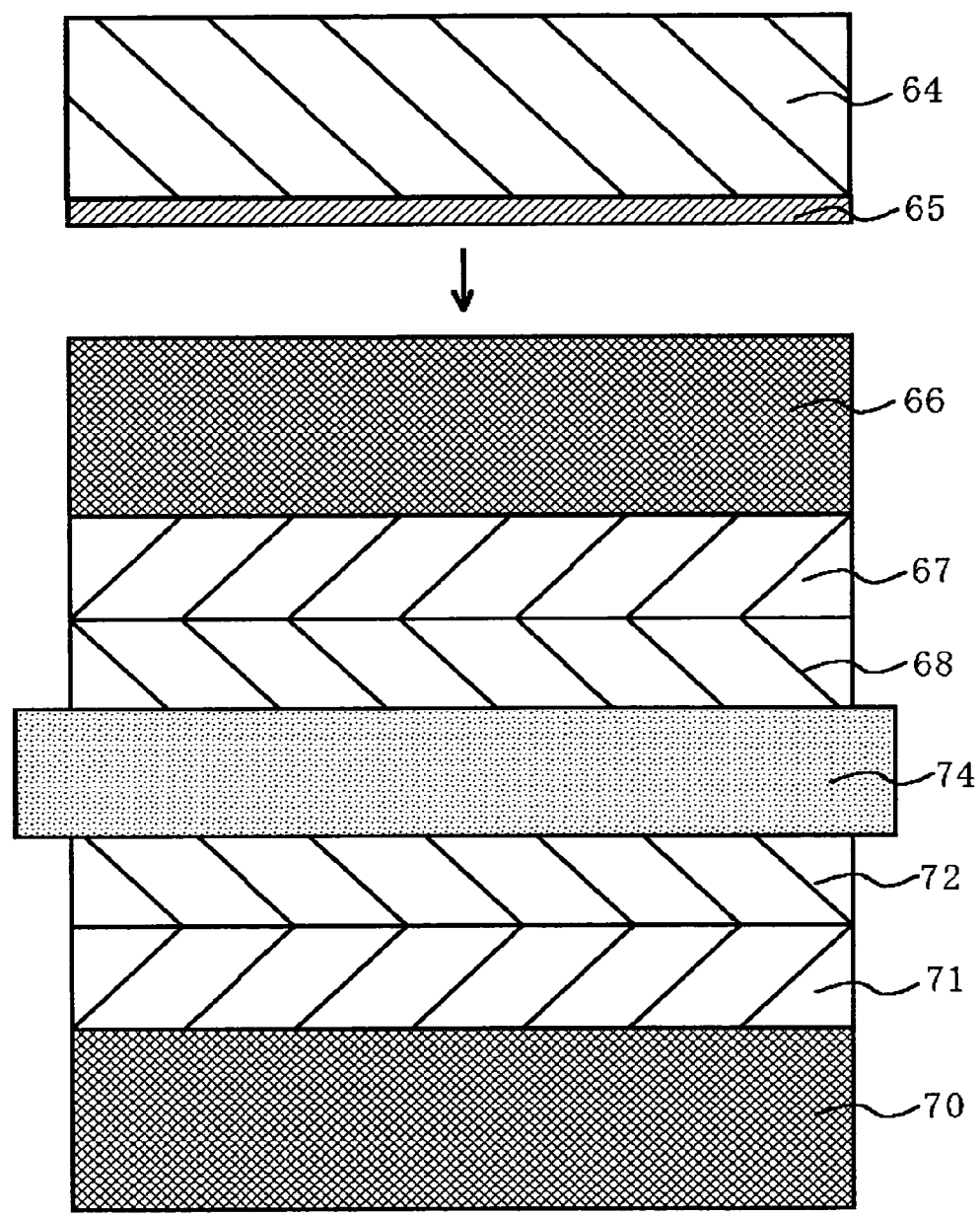

Then, as shown in FIG. 12E, the independent article 82 is disposed on an MEA prepared by a general method on the side of the fuel electrode so that the Pd thin film 65 closely adheres to, for example, a carbon sheet 66 in the MEA. Thus, for example, a structure shown in FIG. 6 comprising the reforming catalyst layer 64, the Pd thin film (hydrogen-selective permeable layer) 65, and the MEA which are integrated with each other is obtained.

According to this method, the Pd thin film 65 is formed on the base layer 81 by sputtering, and the reforming catalyst layer 64 is formed on the Pd thin film by coating, and then the base layer 81 is removed by dissolution. Therefore, almost no stress is exerted on the film when separating the Pd thin film 65 having the reforming catalyst layer 64, and hence, even if the film has only small mechanical strength, the independent article 82 can be easily obtained, and further the Pd thin film 65 obtained is thin, dense, and smooth, so that a liquid-impermeable, hydrogen-selective permeable film can be surely formed.

The base layer 81 is not limited to Al, and other metals, such as an Al alloy, can be used. Alternatively, in a case where polyurethane is used in the base layer, acetone may be used for removing the base layer by dissolution, and a combination of the material for the base layer and the solvent can be appropriately selected. Further, as the solvent, an alkali, such as NaOH, or an acid, such as HCl, may be used.

EXAMPLES

Hereinbelow, the present invention will be described without limitation with reference to the following Examples.

Example 1

A fluororesin and carbon powder were kneaded together in an aqueous solution to prepare a coating composition. The coating composition was applied to a porous carbon sheet, and then heated in an inert gas to a softening temperature of the resin or higher to form a water-repellent carbon coated layer on the carbon sheet as a gas diffusion layer.

Next, a Pt—Ru alloy catalyst carried on carbon was kneaded with an ionic conductor, such as perfluorosulfonic acid, to prepare a coating composition. The coating composition was applied to the above-described carbon sheet having the gas diffusion layer thereon to form a catalyst electrode for a fuel electrode. The coating weight was adjusted so that the Pt—Ru amount became 0.5 mg/cm$^2$.

Similarly, a Pt catalyst carried on carbon was kneaded with an ionic conductor, such as perfluorosulfonic acid, to prepare a coating composition, and the coating composition was applied to another carbon sheet having the gas diffusion layer thereon to form a catalyst electrode for an oxygen electrode. The coating weight was adjusted so that the Pt amount became 0.5 mg/cm$^2$.

The catalyst electrode for the oxygen electrode and the catalyst electrode for the fuel electrode thus prepared were disposed on both sides of an ionic conductor film, such as a perfluorosulfonic acid film, and bonded together under pressure by means of a heated press to produce an MEA for a fuel cell.

Next, a reformer was produced. Specifically, Al was deposited on a glass substrate having a thickness of 1 mm by sputtering so that the resultant Al film had a thickness of 1,000 angstrom. Pd was deposited on the Al film by sputtering so that the resultant Pd film had a thickness of 5,000 angstrom to form a liquid-impermeable, hydrogen-selective permeable film. Powder including $Al_2O_3$ powder having 10% by weight of Pt carried thereon, carbon powder as a conductive material, and a binder comprised of PVdF were kneaded together in an organic solvent comprised of NMP (1-methyl-2-pyrrolidone), and then applied onto the above-formed film and dried to form a reforming catalyst layer.

After the drying, the glass substrate having the layers formed thereon was immersed in an NaOH solution of 5N to dissolve Al, obtaining an independent article of the Pd thin film having the reforming catalyst layer. Al was solely dissolved in an alkali, resulting in a structure such that the reforming catalyst layer (coated film) was deposited on the Pd thin film.

The independent article of Pd thin film having the reforming catalyst layer was put on a porous substrate (porous carbon paper). Thus, a reformer including the catalyst layer and the hydrogen-selective permeable film which were integrated with each other was obtained. The reformer was connected to the above-described fuel cell through a gas conduit.

In this fuel cell system, a liquid mixture of methanol and water in a 1:1 molar ratio was fed to the reformer as a fuel to obtain hydrogen gas, and the hydrogen gas was fed to the fuel electrode and oxygen gas was fed to the oxygen electrode to measure a power output of the fuel cell. This power output was taken as a reference value of 100.

Comparative Example 1

Substantially the same measurement as in Example 1 was conducted except that the Pd thin film in Example 1 was not provided in the reformer. The power output obtained in this example was as low as 60 as compared with a case where the power output in Example 1 was taken as 100. It was confirmed that the liquid fuel had reached the oxygen electrode.

Comparative Example 2

A reformer was produced in substantially the same manner as in Example 1 except that a reforming catalyst layer for reformer was applied to a porous carbon sheet and Pd was deposited on the reforming catalyst layer by sputtering so that the resultant Pd film has a thickness of 5,000 angstrom, and the reformer was connected to the fuel cell to measure a power output. The power output obtained in this example was as low as 60 as compared with the case where the power output in Example 1 was taken as 100. It was confirmed that the liquid fuel had reached the oxygen electrode. It has been found that the Pd thin film does not function as a liquid blocking film unless the Pd thin film is deposited so as to be dense and smooth.

Example 2

A Pt—Ru alloy catalyst carried on carbon was kneaded with an ionic conductor, such as perfluorosulfonic acid, to prepare a coating composition, and the coating composition was applied to a PTFE (polytetrafluoroethylene) sheet called Teflon (registered trademark) and dried. Similarly, a Pt catalyst carried on carbon was kneaded with an ionic conductor, such as perfluorosulfonic acid, to prepare a coating composition, and the coating composition was applied to a PTFE sheet and dried.

The thus prepared catalyst electrode for the oxygen electrode and catalyst electrode for the fuel electrode were disposed on both sides of an ionic conductor film, such as a perfluorosulfonic acid film, and bonded together under pressure by means of a heated press, and then the above-mentioned PTFE sheets were peeled off, namely, in accordance with a so-called decalcomania process to produce an MEA for fuel cell.

Then, a reformer produced in a similar manner as in Example 1 was connected to the fuel electrode, and a gas diffusion layer formed in a similar manner as in Example 1 was provided on the side of the oxygen electrode to prepare a cell structure.

Using the cell structure, a fuel cell unit was produced, and a liquid mixture of methanol and water in a 1:1 molar ratio was fed to the reformer as a fuel and oxygen gas was fed to the oxygen electrode to measure a power output of the fuel cell. The power output obtained in this example was equivalent to 100 in a case where the power output in Example 1 was taken as 100. Excellent properties were obtained even in a case of using a decalcomania process.

Comparative Example 3

A Pd thin film was formed by sputtering on a PTFE sheet, and further the same paste for reforming portion as that used in Example 1 was applied to the resultant Pd thin film and dried, and when it was tried to peel off the PTFE sheet, the coated film was broken, thus making it impossible to produce a reformer.

Comparative Example 4

A fuel cell unit was produced in a substantially similar manner as in Example 1 except that an MEA comprising an ionic conductor film and a catalyst layer (gas diffusion electrode) without a reformer was used. A liquid mixture of methanol and water in a 1:1 molar ratio was fed to the fuel electrode as a fuel and oxygen gas was fed to the oxygen electrode to measure a power output of the fuel cell. The power output obtained in this example was as low as 10 on the initial stage as compared with the case where the power output in Example 1 was taken as 100, and then no power output was obtained within one hour.

Example 3

A fluororesin and carbon powder were kneaded together in an aqueous solution to prepare a coating composition. The coating composition was applied to a porous carbon sheet, and then heated in an inert gas to the softening temperature of the resin or higher to form a water-repellent carbon coated layer on the carbon sheet as a gas diffusion layer.

Next, a Pt—Ru alloy catalyst carried on carbon was kneaded with an ionic conductor, such as perfluorosulfonic acid, to prepare a coating composition. The coating composition was applied to a carbon sheet having the gas diffusion layer thereon to form a catalyst electrode for a fuel electrode. The coating weight was adjusted so that the Pt—Ru amount became 0.5 mg/cm$^2$.

Similarly, a Pt catalyst carried on carbon was kneaded with an ionic conductor, such as perfluorosulfonic acid, to prepare a coating composition, and the coating composition was applied to a carbon sheet having the gas diffusion layer thereon to form a catalyst electrode for an oxygen electrode. The coating weight was adjusted so that the Pt amount became 0.5 mg/cm$^2$.

The thus prepared catalyst electrode for the oxygen electrode and catalyst electrode for the fuel electrode were disposed on both sides of an ionic conductor film, such as a perfluorosulfonic acid film, and bonded together under pressure by means of a heated press to produce an MEA for a fuel cell.

Next, a reforming portion was produced. Specifically, Al was deposited on a glass substrate having a thickness of 1 mm by sputtering so that the resultant Al film had a thickness of 1,000 angstrom. Pd was deposited thereon by sputtering so that the resultant Pd film had a thickness of 5,000 angstrom to form a liquid-impermeable, hydrogen-selective permeable film. Powder comprising $Al_2O_3$ powder having 10% by weight of Pt carried thereon, carbon powder as a conductive material, and a binder comprised of PVdF were kneaded together in an organic solvent comprised of NMP (1-methyl-2-pyrrolidone), and then applied onto the above-formed film and dried to form a reforming catalyst layer.

After the drying, the glass substrate having the layers formed thereon was immersed in an NaOH solution of 5N to dissolve Al, obtaining an independent article of the Pd thin film having the reforming catalyst layer. Al was solely dissolved in an alkali, resulting in a structure such that the reforming catalyst layer (coated film) was deposited on the Pd thin film.

The independent article obtained was provided onto the above-described fuel electrode of the MEA so that the Pd thin film closely adhered to the MEA. Thus, a structure shown in FIG. 6 comprising the reforming catalyst layer, the hydrogen-selective permeable layer, and the MEA which were integrated with each other was obtained.

Using the structure, a fuel cell unit was produced, and a liquid mixture of methanol and water in a 1:1 molar ratio was fed to the fuel electrode as a fuel and oxygen gas was fed to the oxygen electrode to measure a power output of the fuel cell. This power output was taken as a reference value of 100.

Comparative Example 5

Substantially the same measurement as in Example 3 was conducted except that a fuel cell unit was produced without providing the Pd thin film in Example 3. The power output obtained in this example was as low as 60 as compared with a case where the power output in Example 3 was taken as 100. It was confirmed that the liquid fuel had reached the oxygen electrode.

Comparative Example 6

A reformer was produced in substantially the same manner as in Example 3 except that a reforming catalyst layer for reforming portion was applied to a porous carbon sheet and Pd was deposited thereon by sputtering so that the resultant Pd film had a thickness of 5,000 angstrom, and the reformer was connected to the MEA to measure a power output. The power output obtained in this example was as low as 60 as compare with the case where the power output in Example 3 was taken as 100. It was confirmed that the liquid fuel had reached the oxygen electrode. It has been found that the Pd thin film does not function as a liquid blocking film unless the Pd thin film is deposited so as to be dense and smooth.

Example 4

A Pt—Ru alloy catalyst carried on carbon was kneaded with an ionic conductor, such as perfluorosulfonic acid, to prepare a coating composition, and the coating composition was applied to a PTFE (polytetrafluoroethylene) sheet called Teflon (registered trademark) and dried. Similarly, a Pt catalyst carried on carbon was kneaded with an ionic conductor, such as perfluorosulfonic acid, to prepare a coating composition, and the coating composition was applied to a PTFE sheet and dried.

The thus prepared catalyst electrode for the oxygen electrode and catalyst electrode for the fuel electrode were disposed on both sides of an ionic conductor film, such as a perfluorosulfonic acid film, and bonded together under pressure by means of a heated press, and then the above-described PTFE sheets were peeled off, namely, in accordance with the so-called decalcomania process to produce an MEA for a fuel cell.

Then, a reforming portion produced in the same manner as in Example 3 was provided on the side of the fuel electrode so that the Pd thin film closely adhered to the fuel electrode, and a gas diffusion layer formed in the same manner as in Example 3 was provided on the side of the oxygen electrode to prepare a cell structure shown in FIG. 9.

Using the cell structure, a fuel cell unit was produced, and a liquid mixture of methanol and water in a 1:1 molar ratio was fed to the fuel electrode as a fuel and oxygen gas was fed to the oxygen electrode to measure a power output of the fuel cell. The power output obtained in this example was equivalent to 100 in a case where the power output in Example 3 was taken as 100. Excellent properties were obtained even when using a decalcomania process.

Comparative Example 7

A Pd thin film was formed by sputtering on a PTFE sheet, and further the same paste for reforming portion as that used in Example 3 was applied to the resultant Pd thin film and dried, and when it was tried to peel off the PTFE sheet, the coated film was broken, thus making it impossible to produce a fuel cell.

Comparative Example 8

A fuel cell unit was produced in substantially the same manner as in Example 3 except that an MEA merely including an ionic conductor film and a catalyst layer (gas diffusion electrode) without a reforming portion was used. A liquid mixture of methanol and water in a 1:1 molar ratio was fed to the fuel electrode as a fuel and oxygen gas was fed to the oxygen electrode to measure a power output of the fuel cell. The power output obtained in this example was as low as 10 on the initial stage as compared with the case where the power output in Example 3 was taken as 100, and then no power output was obtained within one hour.

The above described embodiments and Examples can be variously changed or modified based on the technical concept in the present invention.

In the fuel reformer of the present invention in an embodiment, the above-mentioned liquid fuel (e.g., methanol and water) is supplied to the side of the above-mentioned catalyst layer in the above-mentioned reformer and the above-mentioned liquid fuel is reformed by the above-mentioned catalyst layer into hydrogen gas, and this hydrogen is fed through the above-mentioned hydrogen permeable layer to, for example, an electrochemical device where desired electrochemical energy can be obtained. The liquid fuel is reformed into hydrogen before being fed to the electrochemical device in this way and therefore, even when the liquid fuel having a high concentration is fed to the reformer, liquid, such as methanol, is blocked by the hydrogen permeable layer and hence satisfactorily prevented from penetrating into the electrochemical device, so that power output can efficiently be obtained.

Therefore, especially when the reformer is provided independently of the electrochemical device, the above-mentioned liquid fuel can be supplied in a high concentration and efficiently reformed by the system having a simplified structure, and further the liquid can be prevented from going into the electrochemical device, and thus a fuel reformer having both high weight energy density and high volume energy density can be easily realized.

In addition, in the method for producing a fuel reformer of the present invention, for obtaining the above-mentioned hydrogen permeable layer, the above-mentioned hydrogen permeable layer and the above-mentioned catalyst layer are formed on the above-mentioned base layer and then the above-mentioned base layer is removed, and therefore the above-mentioned hydrogen permeable layer is formed on the above-mentioned base layer as a liquid-impermeable, dense, smooth, and thin film, and, for example, the above-mentioned base layer can be separated only by dissolution.

Therefore, the above-mentioned hydrogen permeable layer can be obtained as a thin film which is such dense and smooth that the film is impermeable to liquid, and which has such a small thickness that the film is permeable to hydrogen without a need to increase the film strength to a large extent, and further the above-mentioned hydrogen permeable layer is formed so as to be integrated with the catalyst layer for reforming the liquid fuel, and thus a fuel reformer connectable to the above-mentioned electrochemical device can be produced with ease and high efficiency.

Further, in the electrode for an electrochemical device of the present invention and the electrochemical device having the same, by virtue of having a hydrogen permeable layer which is impermeable to liquid and permeable to hydrogen, when, for example, the above-mentioned liquid fuel (e.g., methanol and water) is directly fed to the side of the fuel electrode in the electrochemical device to reform the above-mentioned liquid fuel into hydrogen gas, and desired electrochemical energy is obtained using the above-mentioned hydrogen gas obtained, liquid, such as methanol, is blocked by the hydrogen permeable layer, and hence the liquid fuel can be fed in a high concentration, and penetration of the above-mentioned liquid fuel through an ionic conductor as conventionally caused can be satisfactorily prevented, so that power output can efficiently be obtained.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A fuel reformer comprising:
   a housing comprising a fuel feeding inlet and an outlet;
   a two layer integrated article placed in the housing, the two layer integrated article including a hydrogen permeable layer and a reforming catalyst layer formed on the hydrogen permeable layer, wherein the reforming catalyst layer is formed with a catalyst bound by a binder; and
   a porous substrate placed in the housing, the porous substrate adhered to the hydrogen permeable layer on a side opposite the reforming catalyst layer, wherein the hydrogen permeable layer comprises a material containing a noble metal, and wherein the hydrogen permeable layer is impermeable to liquid;

wherein the porous substrate is adhered to the hydrogen permeable layer facing the outlet.

2. The fuel reformer of claim 1, in which the hydrogen permeable layer has a thickness of about 2 μm or less.

3. The fuel reformer of claim 1, in which the noble metal is selected from group consisting of platinum, palladium, gold, iridium, silver, rhodium, ruthenium and combinations thereof.

4. The fuel reformer of claim 1, in which the catalyst comprises a material including an element of a platinum group.

5. The fuel reformer of claim 1, in which the porous substrate comprises a ceramic.

6. The fuel reformer of claim 1, in which the porous substrate comprises finely divided carbon powder.

7. The fuel reformer of claim 1, in which the binder is an organic binder containing fluorine.

8. The fuel reformer of claim 1, in which the binder is an ionic conductive organic binder containing fluorine.

9. The fuel reformer of claim 1, wherein the thickness of the hydrogen permeable layer ranges from about 0.3 μm to about 1.5 μm.

10. The fuel reformer of claim 1, wherein the catalyst layer decomposes the liquid fuel to form hydrogen.

11. The fuel reformer of claim 1, wherein the hydrogen permeable layer is a thin film comprising a material selected from the group consisting of palladium and a palladium alloy.

12. The fuel reformer of claim 1, wherein the porous substrate comprises a ceramic and the reforming catalyst layer further comprises a conductive material.

13. The fuel reformer of claim 1, wherein the porous substrate comprises a carbon sheet.

* * * * *